(12) United States Patent  
Townsend et al.

(10) Patent No.: US 10,152,628 B2  
(45) Date of Patent: Dec. 11, 2018

(54) DEVICES, METHODS, AND SYSTEMS FOR OCCUPANCY DETECTION

(71) Applicant: HONEYWELL INTERNATIONAL INC., Morris Plains, NJ (US)

(72) Inventors: Robert Townsend, Lancashire (GB); Sahand Ghanoun, Guildford (GB)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/462,215

(22) Filed: Mar. 17, 2017

(65) Prior Publication Data

US 2017/0323156 A1    Nov. 9, 2017

(30) Foreign Application Priority Data

Mar. 23, 2016  (EP) .................................... 16162101

(51) Int. Cl.
| | |
|---|---|
| G06T 1/00 | (2006.01) |
| G06K 9/00 | (2006.01) |
| G06T 7/11 | (2017.01) |
| G06T 7/20 | (2017.01) |
| H04N 5/232 | (2006.01) |
| H04N 7/18 | (2006.01) |

(52) U.S. Cl.
CPC ..... *G06K 9/00369* (2013.01); *G06K 9/00718* (2013.01); *G06K 9/00771* (2013.01); *G06T 7/11* (2017.01); *G06T 7/20* (2013.01); *H04N 5/23293* (2013.01); *H04N 7/183* (2013.01); *G06T 2207/10016* (2013.01); *G06T 2207/20104* (2013.01); *G06T 2207/30196* (2013.01); *G06T 2207/30232* (2013.01)

(58) Field of Classification Search  
None  
See application file for complete search history.

(56) References Cited

U.S. PATENT DOCUMENTS

| | | | | |
|---|---|---|---|---|
| 2004/0156530 A1* | 8/2004 | Brodsky | .................. | G06K 9/32 |
| | | | | 382/103 |
| 2009/0154768 A1* | 6/2009 | Bell | .................. | G06K 9/00771 |
| | | | | 382/103 |

FOREIGN PATENT DOCUMENTS

| | | |
|---|---|---|
| EP | 2339506 A2 | 6/2011 |
| JP | 2006153467 A | 8/2006 |
| WO | 2014120180 A1 | 8/2014 |

OTHER PUBLICATIONS

Communication Pursuant to Article 94(3) EPC from related EP Application No. 16162101, dated Oct. 19, 2017, 5 pages.  
McKenna, Stephen J, et al., "Summarising contextual activity and detecting unusual inactivity in a supportive home environment", Pattern Annal Applic (2005) pp. 386-401.

* cited by examiner

*Primary Examiner* — Delomia L Gilliard  
(74) *Attorney, Agent, or Firm* — Brooks, Cameron & Huebsch, PLLC

(57) ABSTRACT

Devices, methods, and systems for occupancy detection are described herein. One device includes instructions to receive an image of a portion of a facility captured by an imaging device, the image defined by a field of view, and set a first occupancy detection threshold for a first part of the field of view and a second occupancy detection threshold for a second part of the field of view.

18 Claims, 3 Drawing Sheets

DEVICES, METHODS, AND SYSTEMS FOR OCCUPANCY DETECTION

CROSS REFERENCE TO RELATED APPLICATION

This application claims priority to EP Application No. 16162101.6, filed Mar. 23, 2016, which is incorporated herein by reference in its entirety.

TECHNICAL FIELD

The present disclosure relates to devices, methods, and systems for occupancy detection.

BACKGROUND

Facilities may employ occupancy detection. Occupancy detection may be used in security and/or energy management, among other contexts. Detecting occupancy may involve the use of imaging sensors, for instance, which may be used to detect movement.

However, because imaging sensors operate to detect movement, previous approaches may falsely declare an area of a facility vacant if a subject (e.g., person) moves to a location within the facility where they cannot be seen.

DETAILED DESCRIPTION

Figure 1:
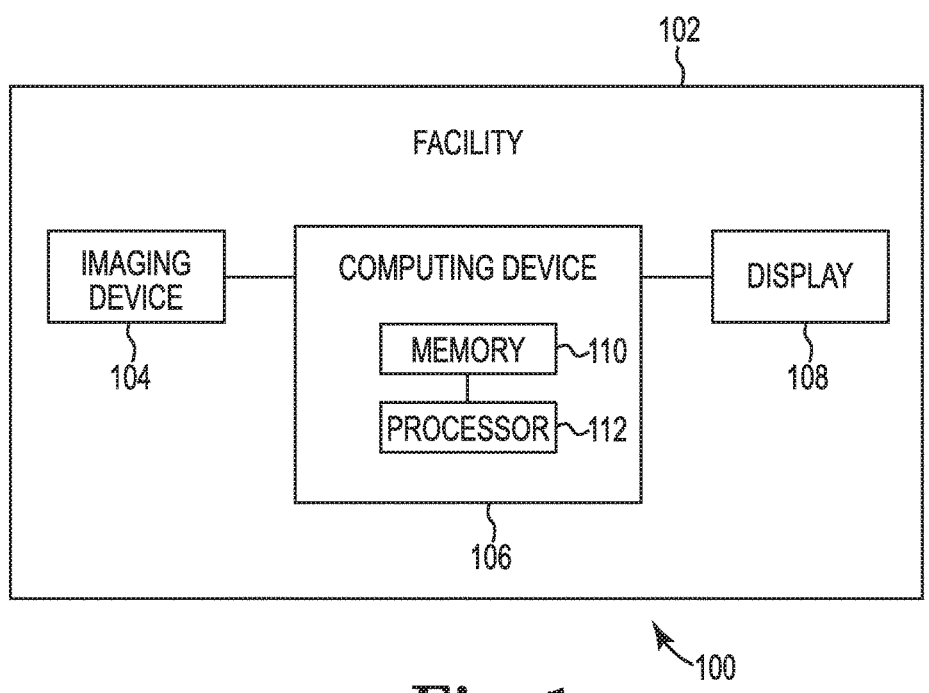
FIG. 1 illustrates a system for occupancy detection in accordance with one or more embodiments of the present disclosure.

Devices, methods, and systems for occupancy detection are described herein. For example, one or more embodiments include receiving an image of a portion of a facility captured by an imaging device, the image defined by a field of view, and setting a first occupancy detection threshold for a first part of the field of view and a second occupancy detection threshold for a second part of the field of view.

Occupancy detection in accordance with one or more embodiments of the present disclosure can include the identification and/or distinguishing, within a video image, of an "area of interest" during the process of commissioning an imaging sensor. Then, the area of interest can be given different treatment with respect to occupancy detection than other (e.g., non-interest) areas. It is noted that more than one area of interest can be identified by embodiments herein and different occupancy detection treatments can be applied thereto.

In some embodiments, the area of interest can correlate to a window of the facility, where occupancy detection can be inhibited. In some embodiments, the area of interest can correlate to a doorway, where detection sensitivity and processing priority can be increased. In some embodiments, the area of interest can correlate to an area capable of occluding a subject (e.g., an area capable of being visually occluded by an object, and hereinafter referred to as an "occlusion area"). Occlusion areas may be given different treatment with respect to occupancy detection in that they may be assigned a particular time delay allowing a subject to reappear therefrom.

In some embodiments, identifying an area of interest can be done automatically (e.g., without user input). That is, embodiments of the present disclosure can identify an area of interest from observing a particular portion of a facility over a period of time and determining movement patterns therein. In some embodiments, a user can define an area of interest (e.g., using a display device). In some embodiments, user input(s) may be used in conjunction with automatic identification.

Accordingly, embodiments of the present disclosure can avoid issues associated with falsely determining an area of a facility to be vacant when a subject moves to a location where they cannot be seen. In addition, embodiments of the present disclosure can pay special attention to areas of ingress and/or egress (e.g., doors) to enhance occupancy detection. Further, embodiments of the present disclosure can inhibit or reduce detection in some areas where occupancy detection is undesirable and/or unnecessary (e.g., windows). Embodiments of the present disclosure can thereby increase occupancy detection accuracy and/or effectiveness.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of subjects" can refer to one or more subjects.

FIG. 1 illustrates a system 100 for occupancy detection in accordance with one or more embodiments of the present disclosure. As shown in FIG. 1, system 100 includes an imaging device 104, a computing device 106, and a display 108.

In some embodiments, the imaging device 104 can be a video camera. The imaging device 104 can be an electronic or digital camera that operates to capture images (e.g., video images, videos, etc.). In some embodiments, the imaging device 104 can be secured at a fixed position. That is, the imaging device can be configured to capture images of over time from a same position and at a same viewing angle. An "image" as used herein, can refer to a single frame of a video image and/or to multiple frames of a video image (e.g., a video).

The imaging device 104 can include an imaging sensor. The imaging sensor can include a charge-coupled device (CCD) and/or a complementary metal-oxide-semiconductor (CMOS) device, for instance, though embodiments herein are not so limited. The imaging sensor can include a plurality of pixels arranged into rows and columns, for instance. The imaging device 104 can be in communication with the computing device 104 and, in some embodiments, can be controlled thereby.

The imaging device 104 can be configured to detect motion. Motion detection can include changes in light intensity over pixels of the imaging sensor and/or positional changes of contrast gradients. The imaging device can operate to capture images in one or more wavelengths (e.g., visible light, infrared, etc.). It is noted that methods and/or devices used to detect motion are not intended to be limited herein.

As shown, one or more devices of the system 100 can be located in a facility 102. The facility 102 can be and/or include a structure. For example, the facility can be a plant, a warehouse, an office building, a refinery, a laboratory, etc.

The imaging device 104 can be configured to capture an image (e.g., a video image) of a portion of the facility 102. The portion of the facility 102 can be a room, for instance, though embodiments of the present disclosure are not so limited. For instance, the portion can be an open space, a part of a room, the entirety of the facility, or some other area. In some embodiments, the imaging device can be located in the facility 102 (e.g., on or near a ceiling of the facility 102), while the computing device 106 and/or the display 108 are located outside the facility 102 (e.g., at a location remote with respect to the facility 102).

The computing device 106 can be, for example, a laptop computer, a desktop computer, or a mobile device (e.g., a smart phone, a personal digital assistant (PDA), a tablet, etc.), among other types of computing devices. As shown in FIG. 1, the computing device 106 includes a memory 110 and a processor 112 coupled to the memory 110. The memory 110 can be any type of storage medium that can be accessed by the processor 112 to perform various examples of the present disclosure. For example, the memory 110 can be a non-transitory computer readable medium having computer readable instructions (e.g., computer program instructions) stored thereon that are executable by the processor 112 to detect occupancy in accordance with one or more embodiments of the present disclosure.

The memory 110 can be volatile or nonvolatile memory. The memory 110 can also be removable (e.g., portable) memory, or non-removable (e.g., internal) memory. For example, the memory 110 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although the memory 110 is illustrated as being located in the computing device 106, embodiments of the present disclosure are not so limited. For example, the memory 110 can also be located internal to another computing resource (e.g., enabling computer readable instructions to be downloaded over the Internet or another wired or wireless connection).

The display 108 can be a user interface (e.g., screen), for instance. The display 108 can be a touch-screen (e.g., the display 108 can include touch-screen capabilities). The display 108 can provide (e.g., display and/or present) information to a user of the computing device 106. Though not shown in FIG. 1, the display 108 can be a computing device analogous to the computing device 106, previously described (e.g., including a processor and a memory). In some embodiments, the display 108 is a mobile device (e.g., smart phone, personal digital assistant (PDA), tablet, etc.).

The computing device 106 can receive information from the user of the display 108 through an interaction with the user via the display 108. For example, the computing device 106 can receive input from the user via the display 108. The user can enter inputs into computing device 106 using, for instance, a mouse and/or keyboard associated with computing device 106, or by touching the display 108 in embodiments in which the display 108 includes touch-screen capabilities (e.g., embodiments in which the display 108 is a touch screen).

Figure 2:
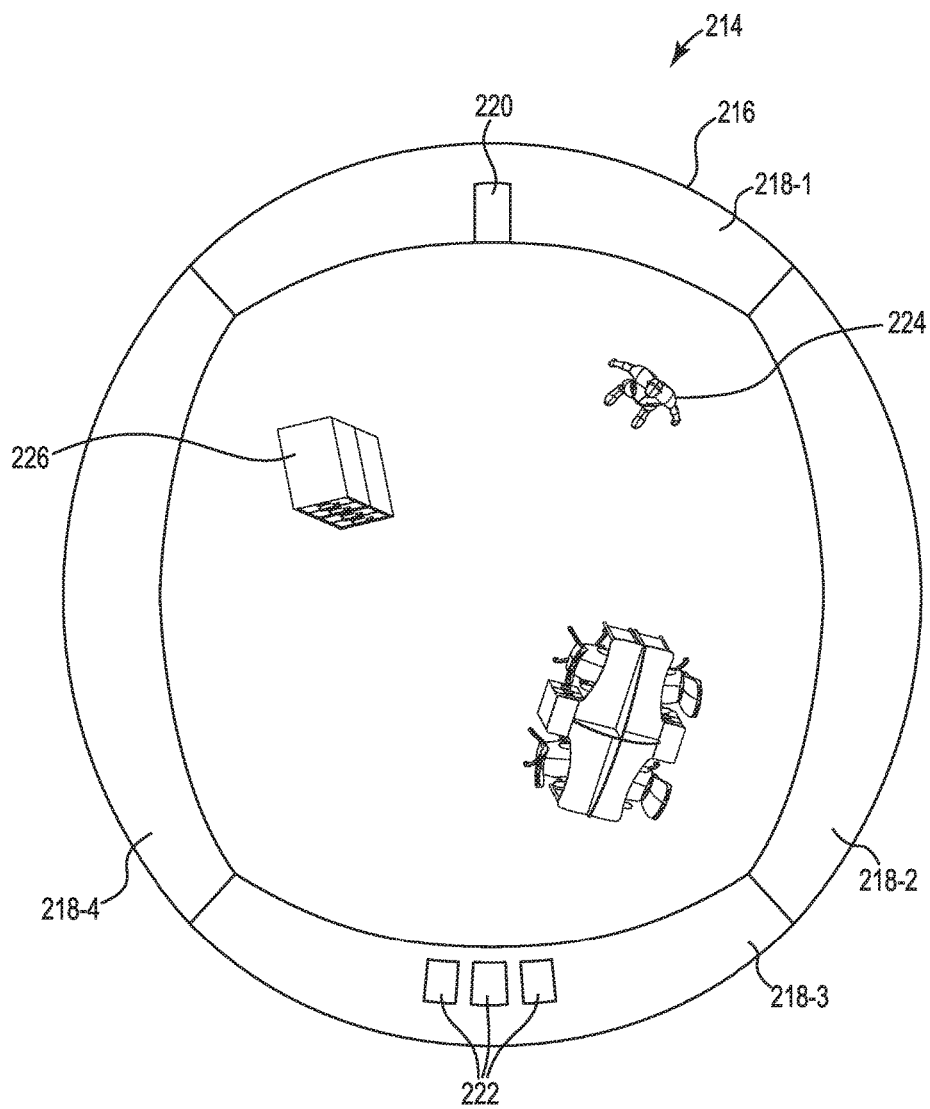
FIG. 2 illustrates an image of a portion of a facility captured by an imaging device in accordance with one or more embodiments of the present disclosure.

FIG. 2 illustrates an image 214 of a portion of a facility captured by an imaging device in accordance with one or more embodiments of the present disclosure. In some embodiments, the image 214 can be a frame of a video image captured by an imaging device (e.g., the imaging device 104, previously discussed in connection with FIG. 1). The image 214 can be displayed by a display (e.g., the display 108 previously described in connection with FIG. 1).

As shown in FIG. 2, the image 214 can be taken from an imaging device located on a ceiling of the portion of the facility. The image 214 can depict a vertically-downward view of the portion of the facility. The imaging device can be a wide-angle imaging device configured to capture the image such that the entirety of the portion of the facility is imaged. In some embodiments, the imaging device can have a fisheye and/or 360-degree lens. The image 214 is defined by a field of view 216. Though a substantially circular field of view is shown as field of view 216, embodiments of the present disclosure are not limited to a particular imaging device, and similarly not limited to a particular field of view.

Figure 3:
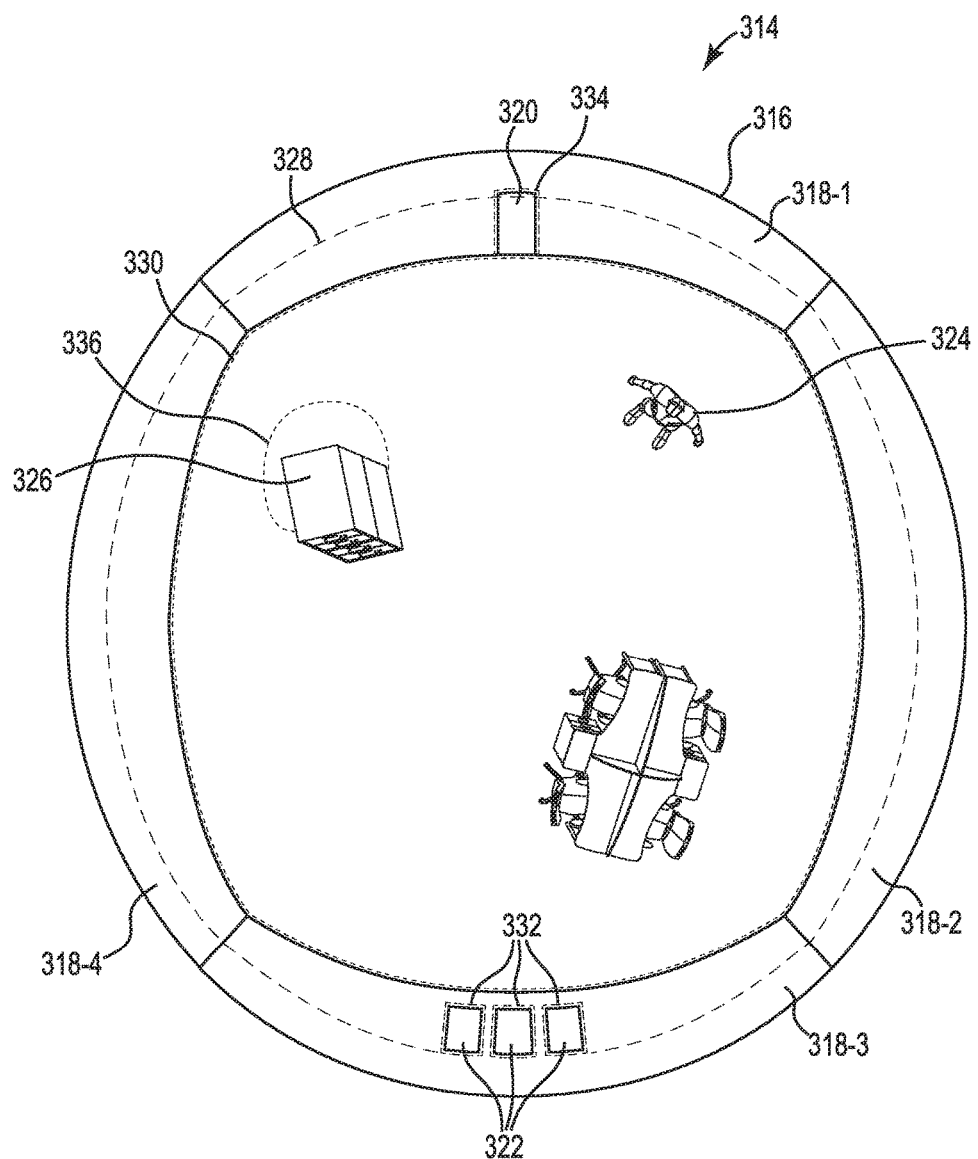
FIG. 3 illustrates the image shown in FIG. 2 with the identification of areas of interest in accordance with one or more embodiments of the present disclosure.

As shown in FIG. 2, the portion of the facility shown in the image 214 is a room having four walls: a wall 218-1, a wall 218-2, a wall 218-3, and a wall 218-4 (collectively referred to herein as "walls 218"). For purposes of clarity, the portion of the facility shown in the images of FIGS. 2 and 3 is referred to as a "room," though, as previously discussed, embodiments of the present disclosure are not so limited.

The wall 218-1 of the room includes a door 220. The door 220 can be a portion of the room allowing entry into the room and/or exit from the room. Though one door is shown, embodiments herein are not limited to a particular number of doors. The wall 218-3 of the room includes a plurality of windows 222. Though three windows 222 are shown, embodiments of the present disclosure are not limited to a particular number of windows. In the room is a subject (e.g., a person) 224 and an occlusion object 226. In the example images shown in FIGS. 2 and 3, the occlusion object 226 is illustrated as a rectangular file cabinet for purposes of illustration. As referred to herein the "subject" is a collection of detected contrast changes that may indicate the presence of a person (or other entity for which occupancy is to be determined).

Occupancy of the room (whether the room is occupied by a subject) can be determined based on movement within the room. That is, determined movement within the room indicative of a subject can result in a determination that the room is occupied. Occupancy detection can additionally include the determination of a number of subjects within the room. One or more thresholds associated with what constitutes movement and/or what constitutes non-movement can be set (e.g., via a computing device).

As previously discussed, embodiments of the present disclosure can include the identification of one or more areas of interest within a portion of a facility imaged by an imaging device. An area of interest, as referred to herein, is an area where a desired approach to occupancy detection may be different from another area (e.g., an area that is not an area of interest and/or a different area of interest). That is, an area of interest can be first part of the field of view 216, and another area can be a second part of the field of view 216.

As discussed further below, reducing and/or increasing occupancy detection for an area of interest can include reducing and/or decreasing a threshold associated with determined movement. In some embodiments, a threshold for motion sensitivity can be increased and/or decreased. That is, a first occupancy detection threshold can be set for a first part of the field of view (e.g., the area of interest) and a second occupancy detection threshold can be set for a second part of the field of view (e.g., an area outside the area of interest). In some embodiments, a time threshold for movement and/or non-movement can be increased and/or decreased.

In some embodiments, an area of interest can be an area where occupancy detection is undesirable and/or where a reduced level of occupancy detection is desired. For example, occupancy detection may be undesirable in areas defined by the windows 222 because motion may be undesirably detected outside the room. In another example, an area defined by a height in the room greater than a particular height (e.g., eight feet) may be deemed to be less likely to depict movement of a subject than an area less than that height.

In some embodiments, an area of interest can be an area where an increased level of occupancy detection is desired. For example, an area around the door 220 may be an area of interest in that motion near the door 220 may be indicative of a subject entering or exiting the room and thus bear directly on occupancy of the room. In another example, an area defined by a floor of a room may be an area of interest in that movement near the floor may be indicative of a subject moving in the room, while movement on a tabletop and not on the floor, for instance, may be less indicative of a subject in the room than of papers blowing due to a breeze. In another example, an area associated with (e.g., near and/or around) an object capable of occluding a subject may be an area of interest in that if the subject moves behind the object, motion may not be detected though the subject remains in the room.

In some embodiments, an area of interest can be identified automatically (e.g., without user input). For example, edge detection can be employed to distinguish walls, floors, corners, doors, windows, and other features of a room. In another example, an area of interest can be identified by observing the room via the imaging device over a period of time and determining movement and/or occupancy patterns therein.

In some embodiments, a user can define an area of interest using an image of the room (e.g., image 214). In some embodiments, user input(s) may be used in conjunction with automatic identification. An area of interest can be defined using information in addition to image(s) captured using imaging devices. For example, building information modeling (BIM) data can be received to enhance information gleaned from one or more images of the room.

FIG. 3 illustrates the image 314 shown in FIG. 2 with the identification of areas of interest in accordance with one or more embodiments of the present disclosure. The image 314 is analogous to the image 214 illustrated in FIG. 2 in that the image 314 is defined by a field of view 316, and depicts a room including the walls 318, the door 320, the windows 322, the subject 324, and the occlusion object 326.

As shown, areas of interest have been identified within the image 314. As previously discussed, the identification of areas of interest can be done with or without user input. In some embodiments, automatic identification may be employed (e.g., using edge detection) to identify areas of interest based on a shape of the room.

In some embodiments, a user can "draw" or "paint" a free-form area of interest onto the image 314 using a touch screen display (e.g., the display 108). The area of interest can be displayed as it is drawn (e.g., in real time). In some embodiments, a user can utilize a mouse, keyboard, or other input device to create the area of interest. In some embodiments, user can manipulate and/or edit an identified area of interest using a touch screen and/or input device. In some embodiments, a list of selectable shapes can be provided for creating and/or modifying an area of interest. In some embodiments, a user can select and reposition portions (e.g., vertices) of an area of interest. The area of interest can be displayed using a particular color, gradient, line style, and/or combination of different display techniques.

Though areas of interest are not intended to be limited by the present disclosure, a number of examples are discussed herein for purposes of illustration. For instance, a height area of interest 328 is shown as an area of the image 314 corresponding to an area of the room below a particular height. The boundary of the height area of interest 328 can be defined as a height above which subject movement is determined to be below a particular level of likelihood. Embodiments of the present disclosure can determine the height area of interest 328 by one or more of the methods previously discussed. For example, the height area of interest 328 can be determined by receiving information (e.g., BIM data), edge detection, monitoring the room for a period of time using the imaging device and, for instance, determining that motion above the height area of interest 328 may not be indicative of occupancy, and/or user input of the height area of interest 328.

Regions of an imaging sensor can be associated with areas of interest. That is, a particular number, location, and/or configuration of pixels of the imaging sensor can be associated with an area of interest. A region of an image sensor associated with the height area of interest 328 (e.g., that detects motion in the height area of interest 328) may be configured differently than another region that detects motion outside of the height area of interest 328. Motion may be "ignored" when it occurs outside the height area of interest 328 as it may be determined that such motion is not indicative (or less indicative) of occupancy as it occurs at too elevated a height. That is, in some embodiments, a threshold for what is determined to be motion may be increased outside of the height area of interest 328 compared with inside.

A floor area of interest 330 is shown as an area of the image 314 corresponding to an area of the room substantially equivalent to an area of the floor (e.g., overlapping the floor). Embodiments of the present disclosure can determine the floor area of interest 330 by one or more of the methods previously discussed. For example, the floor area of interest 330 can be determined by receiving information (e.g., BIM data), edge detection, monitoring the room for a period of time using the imaging device and, for instance, determining that motion above the floor area of interest 330 may not be indicative of occupancy, and/or user input of the floor area of interest 328.

A region of an image sensor associated with the floor area of interest 330 (e.g., that detects motion in the floor area of interest 330) may be configured differently than another region that detects motion outside of the floor area of interest 330. Motion may be "ignored" when it occurs outside the floor area of interest 330 as it may be determined that such motion is not indicative (or less indicative) of occupancy as subjects tend to contact the floor. That is, in some embodiments, a threshold for what is determined to be motion may be increased outside of the floor area of interest 330 compared with inside.

A window area of interest 332 is shown as an area of the image 314 corresponding to an area of the room substantially equivalent to an area of windows in the room (e.g., overlapping windows of the room). Embodiments of the present disclosure can determine the window area of interest 332 by one or more of the methods previously discussed. For example, the window area of interest 332 can be determined by receiving information (e.g., BIM data), edge detection, monitoring the room for a period of time using the imaging device and, for instance, determining that motion in the window area of interest 332 may not be indicative of occupancy, and/or user input of the window area of interest 332.

A region of an image sensor associated with the window area of interest 332 (e.g., that detects motion in the window area of interest 330) may be configured differently than another region that detects motion outside of the window area of interest 332. Motion may be "ignored" when it occurs in the window area of interest 332 as it may be determined that such motion is not indicative (or less indicative) of occupancy because that motion may occur outside the room. That is, in some embodiments, a threshold for what is determined to be motion may be increased inside of the window area of interest 332 compared with outside.

A door area of interest 334 is shown as an area of the image 314 corresponding to an area of the room substantially equivalent to an area of a door in the room (e.g., overlapping a door of the room). Embodiments of the present disclosure can determine the door area of interest 334 by one or more of the methods previously discussed. For example, the door area of interest 334 can be determined by receiving information (e.g., BIM data), edge detection, monitoring the room for a period of time using the imaging device and, for instance, determining that motion in the door area of interest 334 may be indicative of occupancy, and/or user input of the window area of interest 334.

A region of an image sensor associated with the door area of interest 334 (e.g., that detects motion in the door area of interest 334) may be configured differently than another region that detects motion outside of the door area of interest 334. Motion may be given special attention when it occurs in the door area of interest 334 as it may be determined that such motion is indicative (or more indicative) of occupancy because that motion may be subjects entering or exiting the room. That is, in some embodiments, a threshold for what is determined to be motion may be decreased inside of the door area of interest 334 compared with outside.

An occlusion area of interest 336 is shown as an area of the image 314 corresponding to an area of the room associated with the occlusion object 326. As previously discussed, the occlusion object 326 is an object capable of occluding the subject 324. That is, the occlusion object 326 can be an object behind which the subject 324 is occluded. For example, the occlusion object 326 can be a machine, a structure, a vehicle, etc. The occlusion area of interest 336 can be an area surrounding (or partially surrounding) the occlusion object 326. The occlusion area of interest 336 can be adjacent to the occlusion object 326. In some embodiments, the occlusion area of interest 336 can overlap (or partially overlap) the occlusion object 326. In some embodiments, the occlusion area of interest 336 may not overlap (or partially overlap) the occlusion object 326.

Embodiments of the present disclosure can determine the occlusion area of interest 336 by one or more of the methods previously discussed. For example, the occlusion area of interest 336 can be determined by receiving information (e.g., BIM data), edge detection, monitoring the room for a period of time using the imaging device and, for instance, determining that motion in the occlusion area of interest 336 may be indicative of occupancy, and/or user input of the occlusion area of interest 334.

In some embodiments, the identification of the occlusion area of interest can be determined automatically based on the nature of the movement of the subject 324. That is, if the subject 324 is known to be moving at a particular speed and "disappears" at a similar rate from one of its edges; such a scenario is distinguishable from another scenario in which the subject 324 simply stops moving. The subject 324 is, for instance, unlikely to "fade" into the occlusion area of interest 336; rather, the subject 324 is more likely to walk into the occlusion area of interest 336.

A region of an image sensor associated with the occlusion area of interest 336 (e.g., that detects motion in the occlusion area of interest 336) may be configured differently than another region that detects motion outside of the occlusion area of interest 336. Motion may be given special attention when it occurs in the occlusion area of interest 336 because that motion may be subjects that are about to be occluded by the occlusion object 326. That is, in some embodiments, a threshold for what is determined to be motion may be decreased inside of the occlusion area of interest 336 compared with outside.

In some embodiments, the occlusion area of interest 336 may be assigned a particular time delay allowing a subject to reappear therefrom. That is, if, under normal circumstances, for example, detected movement every 5 seconds indicates occupancy, a region of the image sensor associated with the occlusion area of interest may be configured such that detected movement every 30 seconds indicates occupancy. Thus, rather than determining the room to be unoccupied when the subject 324 becomes occluded, embodiments of the present disclosure can allow time for the subject 324 to reappear.

Allowing the subject 324 to reappear can allow embodiments of the present disclosure to increase the functionality of one or more facility systems. Under previous approaches, when a subject becomes occluded, motion will not be detected and thus the room may be determined to be unoccupied. If a room is unoccupied, previous approaches may deactivate lighting in the room and/or activate a security system in the room. In contrast, embodiments of the present disclosure may allow the subject 324 to carry on without impediment.

Upon visualizing an area of interest using the display, a user can dictate how the area is to be configured with respect to occupancy detection. As previously discussed, a threshold for motion detection in an area of interest can be set and/or adjusted (e.g., increased and/or decreased). Setting and/or adjusting the threshold can include setting and/or adjusting a sensitivity of motion detection. Setting and/or adjusting the threshold can include setting and/or adjusting a time between motion detection events (e.g., threshold-exceeding detected motions) required for a determination of occupancy in a room.

The identifications of the area (or areas) of interest can be stored in memory along with the occupancy detection settings (e.g., occupancy detection thresholds) applied thereto. Then, the imaging device can capture a subsequent video image (e.g., after commissioning) from a same position and/or viewing angle. The different thresholds can be applied to each area of interest, and to areas outside the areas of interest, in accordance with their settings.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon executable by a processor to:
   receive an image of a portion of a facility captured by an imaging device, the image defined by a field of view; and
   set a first occupancy detection threshold for a first part of the field of view and a second occupancy detection threshold for a second part of the field of view, wherein the first occupancy detection threshold and the second occupancy detection threshold have different periods of time between motion detection events required for a determination of occupancy, and wherein the first part of the field of view is an area associated with an occlusion object.

2. The computer-readable medium of claim 1, wherein the first part is an area of interest within the image.

3. The computer-readable medium of claim 1, wherein at least one of the first part of the field of view and the second part of the field of view are defined by a user input.

4. The computer-readable medium of claim 1, wherein the instructions are executable to set at least one of the first occupancy detection threshold and the second occupancy detection threshold responsive to a user input.

5. The computer-readable medium of claim 1, wherein neither the first part of the field of view and the second part of the field of view are defined by a user input.

6. The computer-readable medium of claim 1, wherein the first occupancy detection threshold and the second occupancy detection threshold are each motion detection thresholds.

7. The computer-readable medium of claim 1, wherein the instructions are executable to set a third occupancy detection threshold for a third part of the field of view.

8. The computer-readable medium of claim 2, wherein the first part of the field of view is defined by a user drawing the first part of the field of view on a touch screen display.

9. A method for occupancy detection, comprising:
   receiving an image of a portion of a facility captured by a video camera;
   receiving a user input that distinguishes a first part of the image from a second part of the image;
   setting a first occupancy detection threshold for a region of an imaging sensor associated with the first part of the image; and
   setting a second occupancy detection threshold for a region of the imaging sensor associated with the second part of the image, wherein the first occupancy detection threshold and the second occupancy detection threshold have different periods of time between motion detection events required for a determination of occupancy.

10. The method of claim 9, wherein the first part of the image corresponds to an area of the portion of the facility below a particular height, wherein the second part of the image corresponds to an area of the portion of the facility above the particular height, and wherein the first occupancy detection threshold is lower than the second occupancy detection threshold.

11. The method of claim 9, wherein the first part of the image corresponds to an area associated with a floor of the portion of the facility, wherein the second part of the image corresponds to an area of the portion of the facility outside of the area associated with the floor, and wherein the first occupancy detection threshold is lower than the second occupancy detection threshold.

12. The method of claim 9, wherein the first part of the image corresponds to an area associated with a window of the portion of the facility, wherein the second part of the image corresponds to an area of the portion of the facility outside the area associated with the window, and wherein the first occupancy detection threshold is higher than the second occupancy detection threshold.

13. The method of claim 9, wherein the first part of the image corresponds to an area associated with a door of the portion of the facility, wherein the second part of the image corresponds to an area outside the area associated with the door, and wherein the first occupancy detection threshold is lower than the second occupancy detection threshold.

14. The method of claim 9, wherein the first part of the image corresponds to an area associated with an occlusion object of the portion of the facility, wherein the second part of the image corresponds to an area of the portion of the facility outside the area associated with the occlusion object, and wherein the first occupancy detection threshold is lower than the second occupancy detection threshold.

15. A system for occupancy detection, comprising:
   an imaging device configured to capture a video image of a portion of a facility and a subsequent video image of the portion of the facility from a same position, wherein the imaging device includes an imaging sensor;

a display device configured to:
   display a frame of the video image; and
   receive and display an indication of an area of interest of the frame made by a user;
a computing device configured to:
   associate a first region of the imaging sensor with the area of interest;
   associate a second region of the imaging sensor with an area other than the area of interest;
   receive the subsequent video image;
   apply a first occupancy detection threshold to the first region during the subsequent video image; and
   apply a second occupancy detection threshold to the second region during the subsequent video image, wherein the first occupancy detection threshold and the second occupancy detection threshold have different periods of time between motion detection events required for a determination of occupancy.

16. The system of claim 15, wherein applying the first occupancy detection threshold to the first region includes ignoring motion detected in the first region.

17. The system of claim 15, wherein the first occupancy detection threshold includes a lower motion detection threshold than the second occupancy detection threshold.

18. The system of claim 15, wherein the first occupancy detection threshold includes a longer time delay between motion detection events than the second occupancy detection threshold.

* * * * *